United States Patent [19]

Holzbaur

[11] 4,212,834
[45] Jul. 15, 1980

[54] FUEL SUPPLY SYSTEM

[75] Inventor: Siegfried Holzbaur, Stuttgart, Fed. Rep. of Germany

[73] Assignee: Robert Bosch GmbH, Stuttgart, Fed. Rep. of Germany

[21] Appl. No.: 970,061

[22] Filed: Dec. 15, 1978

[30] Foreign Application Priority Data

Jan. 26, 1978 [DE] Fed. Rep. of Germany ....... 2803267

[51] Int. Cl.² ............................................. F02M 9/08
[52] U.S. Cl. ................................ 261/44 A; 261/44 G
[58] Field of Search ................ 261/44 A, 44 E, 44 G, 261/50 A

[56] References Cited

U.S. PATENT DOCUMENTS

| | | | |
|---|---|---|---|
| 2,078,849 | 4/1937 | Grosjean | 261/44 E |
| 2,925,257 | 2/1960 | Cohn | 261/44 E |
| 3,049,111 | 8/1962 | Bogle | 261/69 R |
| 3,259,379 | 7/1966 | Yost | 261/69 R |
| 4,111,045 | 9/1978 | Sauer et al. | 261/50 A |
| 4,143,102 | 3/1979 | Muller et al. | 261/50 A |

FOREIGN PATENT DOCUMENTS 42858 12/1973 Australia ................................ 261/44 G

*Primary Examiner*—Tim R. Miles
*Attorney, Agent, or Firm*—Edwin E. Greigg

[57] ABSTRACT

A fuel supply system to control an air-fuel mixture for an internal combustion engine which includes an air-flow sensor located in the intake manifold and a manually controlled throttle element. The air-flow sensor includes a rotary element mounted about an axis that extends in the direction of flow, which is moved against a reset force in accordance with the amount of flowing air, so that the air-flow sensor sensor adjusts a fuel supply valve to meter an amount of fuel that corresponds to the amount of air. The rotary element has at least one axial recess which cooperates with a port of the manifold to control an air-flow section and has radial ribs which limit a control chamber having at least one wall securely fixed to the manifold housing, said control chamber being in communication with the intake manifold between the air-flow sensor and the throttle element, while the intake manifold pressure upstream from the air-flow sensor acts upon said ribs. A movable portion of the fuel-metering valve controlled by the air-flow sensor has at least one control slit which opens into a face of the movable portion crosswise to the axis of the air-flow sensor, said control slit arranged to cooperate with at least one control port in a fixed fuel-metering body.

11 Claims, 7 Drawing Figures

FUEL SUPPLY SYSTEM

BACKGROUND OF THE INVENTION

The invention relates to a fuel supply system for internal combustion engines provided with an intake manifold, wherein an air flow sensor and a manually controlled throttle element are arranged in tandem and the air flow sensor is rotatably mounted about an axis which extends in the direction of flow and is moved against a reset force in accordance with the amount of flowing air and during the course of which the air flow sensor adjusts the movable portion of a valve disposed in the fuel supply line in order to meter an amount of fuel that corresponds to the amount of air.

OBJECT AND SUMMARY OF THE INVENTION

By contrast, the fuel supply system according to the present invention has the advantage of a compact space-saving design and an increase in the power of the internal combustion engine with simultaneous reduction of the fuel consumption and of the poisonous exhaust components due to the improved preparation of the air-fuel mixture.

The techniques described in the subclaims allows advantageous further developments and improvements of the fuel supply system set forth in the main claim.

Of particular advantage is the design of the fuel-metering valve comprised of parts which are in contact with each other in a plane surface and capable of turning relatively to each other, whereby a control slit provided in one part and a control port provided in the other part open into the area of contact and are cooperatively associated to form the control section for metering an amount of fuel corresponding to the amount of air inducted. Because of this the plane areas of contact of the two elements of the metering valve can be made very easily.

It is also convenient to make the control slit by placing a sleeve over a bushing and inserting into the joint between the bushing and sleeve a sheet metal strip which has recesses forming the control slits.

The invention will be better understood as well as further objects and advantages thereof become more apparent from the ensuing detailed description of two embodiments taken in conjunction with the drawings.

DESCRIPTION OF THE PREFERRED EMBODIMENTS

Figure 1:
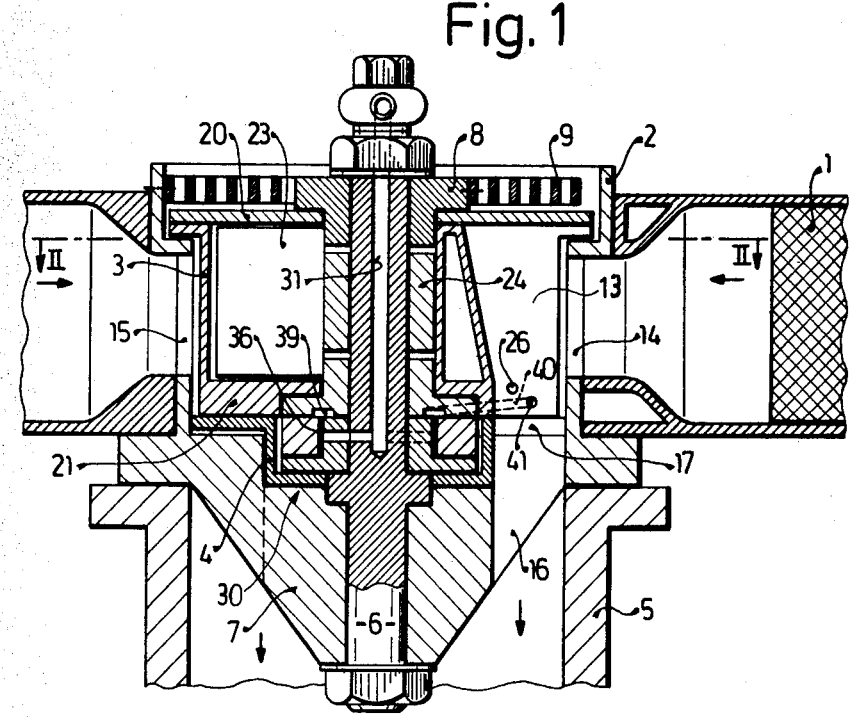
FIG. 1 is a section of a first illustrative embodiment of a fuel supply system taken along the line I—I of FIG. 2.
Figure 2:
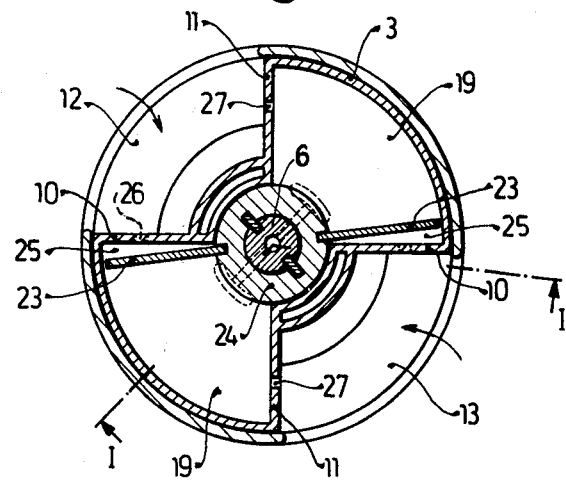
FIG. 2 is a section taken along the line II—II of FIG. 1.

In the first illustrative embodiment of a fuel supply system as shown in FIGS. 1 and 2, the amount of air inducted by a mixture-compressing separately-ignited internal combustion engine flows in the direction of the arrow through an air filter 1 into a housing 2 of an air-flow sensor 3 disposed within the air filter, past the air-flow sensor 3 and a throttle element 4 and into an intake manifold section 5 and from there to one or more cylinders of the internal combustion engine, not shown herein. The air-flow sensor is rotatably mounted about an axle 6, which is attached coaxially to intake manifold section 5 in a carrier element 7 of the housing 2 of the air-flow sensor 3. The air-flow sensor 3 has a circular periphery, is attached to a bearing bushing 8 and is rotatable about the axle 6 to counter the force of a spiral spring 9 which produces the rest force. The spiral spring 9 is securely fixed on the one hand to the housing 2, and on the other, to the bearing bushing 8. As best shown in FIG. 2, the air-flow sensor may have radial ribs 10, 11 which limit recessed areas 12, 13 of the air-flow sensor running in an axial direction, so that the air-flow sensor takes the shape of two connected oppositely-disposed cylinder segments. The opposite portion of the recessed areas 12, 13, which are adjacent to the bearing axle 6, are designed so that a venturi form results in the direction of flow to the intake manifold section 5. In the wall of the housing 2 there are provided in the area of recesses 12, 13 ports 14, 15 over which the intake air that enters from the air filter flows into the recesses. In the carrier element 7 of the housing 2 of the air-flow sensor there are provided, downstream from the air-flow sensor 3, axial flow ports 16, which are more or less opened through flow ports 17 of the same kind in the throttle element 4 designed as a rotary spool and controlled by the gas pedal. The ribs 10—10 and 11—11 of the air-flow sensor 3 form spaces 19—19 which are closed off in the direction of the spiral spring by a cover 20 and in the direction of the intake manifold by the bottom element 21. In each chamber 19 of the air-flow sensor 3 there is disposed a wall 23 that is securely fixed to the housing by a holder sleeve 24 which is connected with the axle 6 affixed to the carrier element 7 of the housing 2 and thus defines a control chamber 25 with the face of the rib 10 oriented toward the recess. The control chamber 25 is in communication, via a bore 26, with the flow section in the recesses 12, 13 directly upstream from the throttle element 4, while the remainder of the chamber 19 is in communication, via the bore 27, with the air pressure upstream from the air-flow sensor, so that as the amount of air inducted increases, the air flow sensor is turned in accordance with the constant-pressure principle (Bernouilli), in order to increase the air-flow sections between the recesses 12, 13 and the flow ports 17 until a constant differential pressure, predetermined by the spiral spring 9, and acting on the air-flow sensor 3, is re-established. The fuel metering valve 30 is directly controlled by the air-flow sensor 3, which will be detailed with reference to FIGS. 3-5. The fuel conveyed from a container by a fuel pump, not shown herein, reaches an axial bore 31 of the axle 6 and a radial cross bores 32 and thence to the outer cylindrical periphery of a bushing 33 that is connected with the axle. A sleeve 34 which is placed over the bushing 33, is prevented from rotating relative to the bushing 33. Also, arranged in the joint between the bushing 33 and the sleeve 34 are round control slits 36 which extend coaxially relative to the axis of the air-flow sensor and open into the front side 35 of the bushing and the sleeve 34. It will be noted that the control slits 36 are in communication with the radial cross bores 32. The control slits in the joint between the bushing 33 and the sleeve 34 may be formed by projections provided on the bushing or the sleeve or even by insertion of, for example, a sheet metal strip 37 (FIG. 5) that is provided with the recesses which form control slits 36. The movable portion 38 of the fuel metering valve 30 bears with its front side against the front side 35 of the bushing 33 and the sleeve 34, said fuel metering valve 30 being connected with the air-flow sensor 3 and, hence, capable of being rotated thereby.

In the front side of the movable part 38 there are provided in the area of the control slits 36 control ports 39 which are arranged coaxially and, for example, take the shape of a kidney and which form in cooperative association with the control slits, in conformity with the rotation of the part 39, a more or less large fuel-metering section. Each recess 12, 13 of the air-flow sensor may have a control slit 36 and a control port 39. Each control port 39 is connected via a line 40 with a nozzle 41 which, near the former, opens into the intake manifold through the air-flow section controlled by the recess, that is to say, in the area of maximum air-flow velocity.

When the engine is operating at a steady state condition, the position of the recesses 12, 13 of the air-flow sensor 3, which controls the air-flow opening between the recesses 12, 13 and the flow ports 17, is determined by the spring 9 which exerts a constant, predetermined force on the air-flow sensor 3, in a direction of rotation to decrease the air-flow opening against an equal force exerted on the air-flow sensor 3 in a direction of rotation to increase the air-flow opening by the differential pressure supplied to the air-flow sensor 3 via the bores 26, 27. If then the amount of air flowing to the engine increases because of a change in the setting of the throttle element 4 or in the operating speed of the engine, the differential pressure supplied to the air-flow sensor will increase to cause the air-flow sensor to rotate in a direction to increase the air-flow opening until the differential pressure decreases to the constant valve determined by the spring 9. Similarly, when the air flowing to the engine decreases, the differential pressure will decrease and the air-flow opening will be decreased by the spring 9 until the differential pressure increases to the constant predetermined value. Thus, the position of the air-flow sensor 3 is quickly and automatically adjusted to correspond to the quantity of air flowing to the engine, and the fuel metering valve 30, which is controlled by the air-flow sensor 3 is quickly adjusted to supply the quantity of fuel corresponding to the quantity of air for the desired air-fuel mixture.

Figure 6:
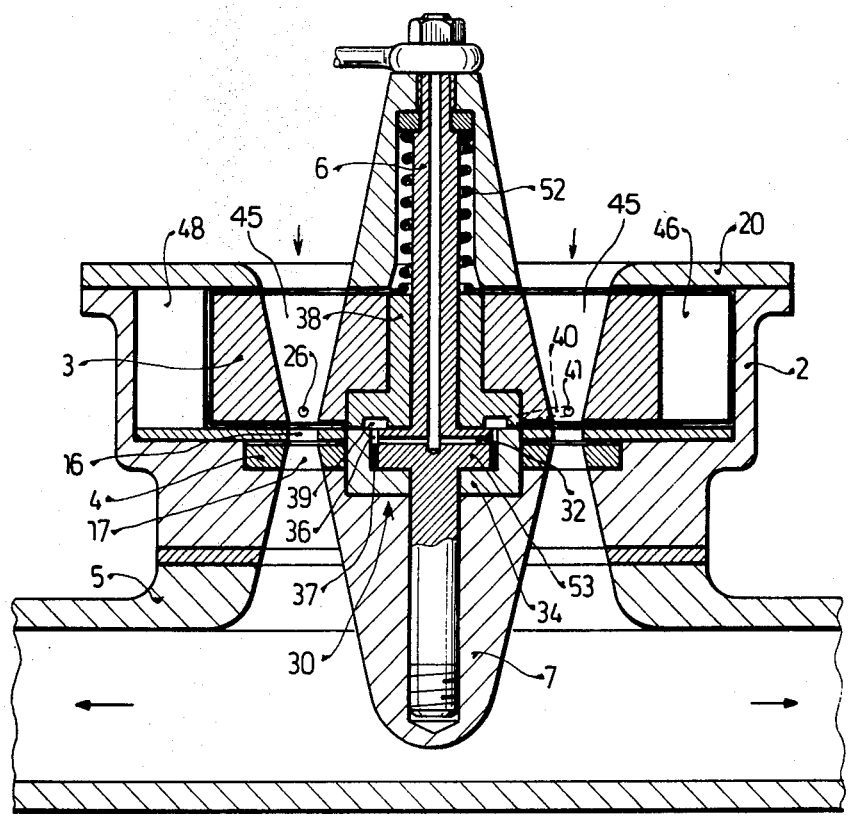
FIG. 6 is a second illustrative embodiment of a fuel supply system.
Figure 7:
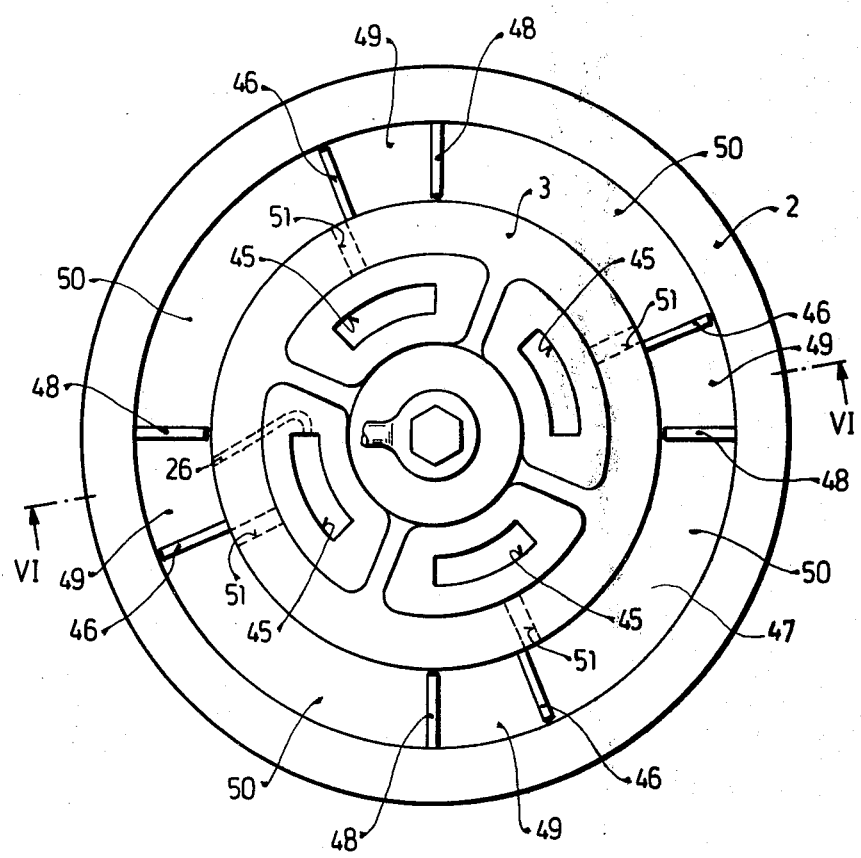
FIG. 7 is a top view of the fuel supply system of FIG. 6 without cover.

In the second illustrative embodiment of a fuel supply system according to FIGS. 6 and 7, like parts are denoted by like reference symbols as used for the illustrative embodiment in the previous figures. As an example, the second illustrative embodiment shows an air-flow sensor 3 which has four recessed areas 45 that extend in the flow direction and each of which are arranged in the form of a venturi that extends in the direction of flow. Depending on the position of the throttle element designed as a rotary spool 4 and arranged crosswise to the flow direction, recessed areas 45 open the flow ports 16, which cooperate more or less therewith. The air-flow sensor 3 functions on the constant-pressure principle. To this end, the air-flow sensor 3 has on its outer periphery, depending on the number of recesses 45, the same number of radial ribs which protrude into a ring-shaped chamber 47 between the air-flow sensor 3 and the housing 2 and enclose, with walls 48 securely fixed to the housing, on the one hand control chambers 49 and, on the other, spaces 50. As indicated only by the bore 26 shown in broken lines, control chambers 49 are in communication with the subpressure in the narrowest venturi section, while the pressure in the intake manifold upstream from air-flow sensor 3, i.e., approximately equal to atmospheric pressure, is admitted to chambers 50 via a slot 51. Thus, as the opening of the intake manifold section through the throttle element 4 increases, there is also an increase in the flow velocity in each of the venturi formed by recessed areas 45 so that, as a result of the pressure difference on the ribs 46, a force is applied to turn the air-flow sensor in a direction to increase the flow section between the recesses and the flow ports 16 until the constant differential pressure on the air-flow sensor predetermined by the torsion spring 52 is reestablished.

Figure 3:
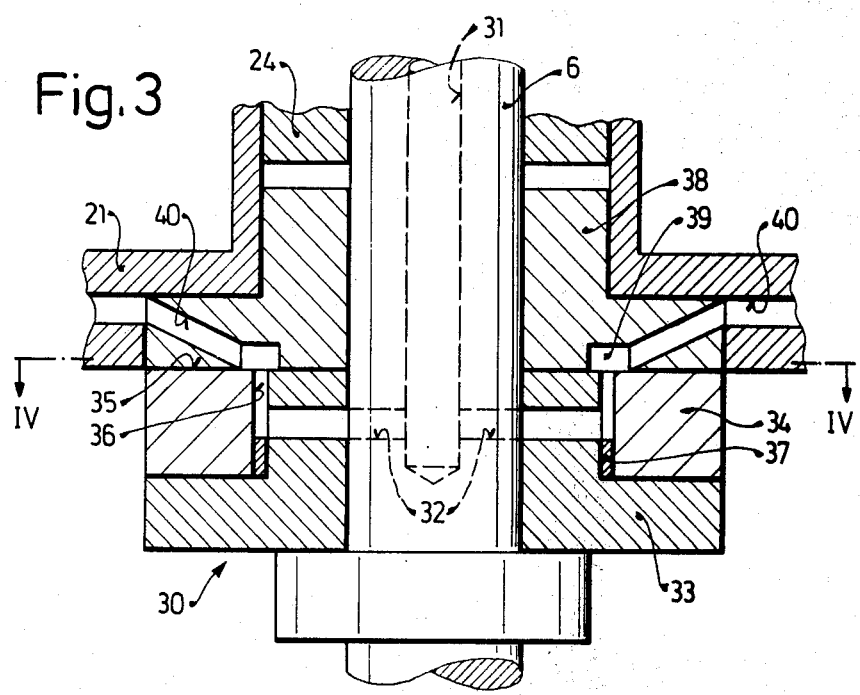
FIG. 3 is an enlarged view of the fuel metering valve of FIGS. 1 and 2.
Figure 4:
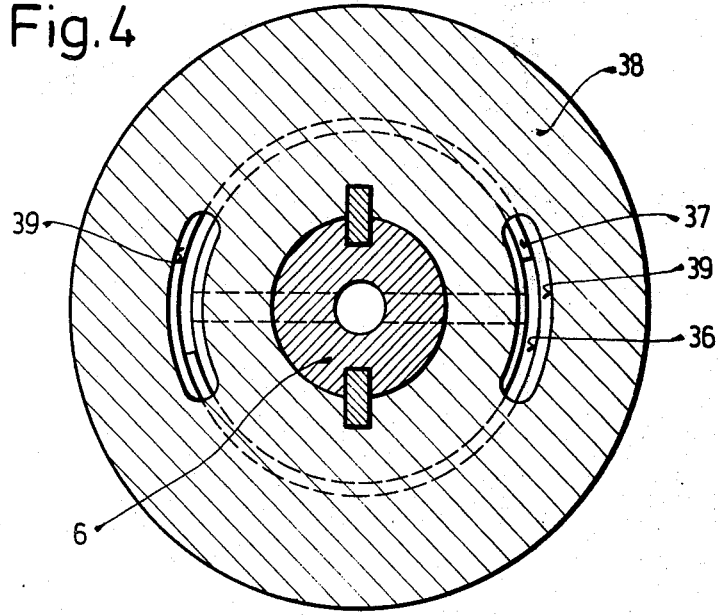
FIG. 4 is a section taken along the line IV—IV of FIG. 3.
Figure 5:
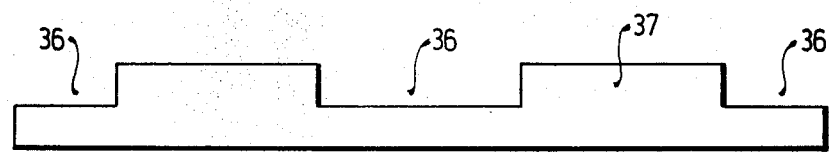
FIG. 5 is a sheet metal strip forming the control slits of the fuel metering valve.

The fuel-metering valve 30 is essentially constructed as described with reference to FIGS. 3–5. In FIG. 6, the bushing 33 of the fuel-metering valve shown in FIG. 3 is replaced by a ring-shaped projection 53 of the axle 6, over which the sleeve 34 is placed in order to form control slits 37 in the resultant joint. The nozzle 41 which is in communication, via line 40, with each control port 39 cooperating with the control slit 36 of the fuel-metering valve 30, opens into each recess 45. The embodiment of FIGS. 6 and 7 operates in the same manner as the embodiment of FIGS. 1–5 to control the air-fuel ratio of the mixture supplied to the engine. The illustrative embodiments of the fuel supply system described herein permit a compact and space-saving design, so that they also can be accommodated in the engine compartment of a motor vehicle, even if there is a minimum of space available, and they are particularly suited for arrangement in an air filter preceding the intake manifold of the internal combustion engine. Satisfactory preparation of the air-fuel mixture and a reduction in the fuel consumption, which at the same time results in a reduction of poisonous exhaust components, are achieved by the allocation, as linearly as possible, of the amount of intake air and metered amount of fuel and by the addition of fuel to the narrowest flow section. The direct coupling between the air-flow sensor and the fuel-metering valve and the short connecting cables between the fuel-metering valve and the fuel nozzles allow rapid adaptation of the air-fuel mixture in the event of changes in the prescribed operating conditions.

It will be readily appreciated that because of the simplicity of the structural elements which comprise this assembly, the parts thereof are easy to manufacture.

The foregoing relates to preferred exemplary embodiments of the invention, it being understood that other embodiments and variants thereof are possible within the spirit and scope of the invention, the latter being defined by the appended claims.

What is claimed is:

1. In a fuel supply system for internal combustion engines provided with an intake manifold defining a flow port, an air-flow sensor having an axis extending in the direction of flow, a manually controlled throttle element disposed in tandem with said air-flow sensor within said manifold, a fuel metering valve means, said air-flow sensor including a reset force means and, a rotary element rotatable about said axis, said rotary element of air-flow sensor further being arranged to control said fuel metering valve means to control fuel in accordance with air flow, the improvement wherein said rotary member has a circular periphery and a control chamber defined therewithin, said rotary member including means defining at least one axial recess which cooperates with said manifold flow part to control an air-flow section therebetween, said air-flow sensor further including means defining at least one opening in said control chamber arranged to communicate with said intake manifold between said air-flow sensor and said throttle element, said rotary member including radially extending rib elements limiting said control chamber, said control chamber having at least one wall securely fixed to said manifold, said air-flow sensor further includes means wherein intake manifold pressure upstream from said air-flow sensor acts on said rib elements, whereby, as induced air increases said rotary element of said air-flow sensor is rotated to increase the air-flow section controlled by said means defining said at least one recess and said manifold flow port.

2. A fuel supply system as claimed in claim 1 further wherein said means defining said at least one recess include said rib elements and said rib elements further include portions, oriented toward said at least one recess, which define a space in which is disposed said wall securely fixed to said manifold and limiting said control chamber.

3. A fuel supply system as claimed in claim 1, further wherein said rib elements are arranged on the outer periphery of said rotary member.

4. A fuel supply system as claimed in claim 1, further wherein said reset force means comprises a spiral spring member.

5. A fuel supply system as claimed in claim 1, further wherein said air-flow sensor is positioned downstream of said air filter.

6. A fuel supply system as claimed in claim 1, further wherein said fuel metering valve means includes a movable portion and a stationary member, said stationary member including a zone and having at least one control slit extending coaxially of the axis of said air flow sensor which opens into said zone, said control slit arranged to cooperate with at least one control port in said movable portion of said fuel metering valve.

7. A fuel supply system as claimed in claim 6, further wherein said movable portion of said fuel-metering valve has a front wall and said control port is defined therein.

8. A fuel supply system as claimed in claim 6, further wherein said control port generally simulates the shape of a kidney.

9. A fuel supply system as claimed in claim 7, further wherein said stationary valve member of said fuel-metering valve is formed by a bushing and a sleeve and said control slit is provided in a joint between said bushing and said sleeve.

10. A fuel supply system as claimed in claim 9, further wherein a sheet metal stip configured to form said at least one control slit is positioned in said joint between said bushing and said sleeve.

11. A fuel supply system as claimed in claim 10, further wherein the means defining said at least one recess in said air-flow sensor cooperates with said control slit and said control port of said fuel-metering valve and further that said control port is connected with a nozzle which opens into said intake manifold.

* * * * *